United States Patent
Niimi

Patent Number: 5,712,522
Date of Patent: Jan. 27, 1998

[54] STARTER WITH MULTI-LAYERED BRUSH STRUCTURE

[75] Inventor: Masami Niimi, Handa, Japan

[73] Assignee: Nippondenso Co., Ltd., Kariya, Japan

[21] Appl. No.: 653,317

[22] Filed: May 24, 1996

[30] Foreign Application Priority Data

May 26, 1995 [JP] Japan ................... 7-127904
Apr. 10, 1996 [JP] Japan ................... 8-87767

[51] Int. Cl.⁶ .......................... H02K 13/00; H02K 13/10
[52] U.S. Cl. .................... 310/248; 310/251; 310/237; 310/245
[58] Field of Search .................... 310/241, 245, 310/248, 251, 252, 237

[56] References Cited

U.S. PATENT DOCUMENTS

| | | | |
|---|---|---|---|
| 554,369 | 2/1896 | Loomis | 310/248 |
| 1,416,256 | 4/1922 | Borger | 310/264 |
| 2,613,239 | 10/1952 | Lundy | 310/251 |
| 3,456,143 | 7/1969 | Uemura et al. | 310/220 |
| 4,573,364 | 3/1986 | Givan | 310/83 |
| 4,852,417 | 8/1989 | Tanaka | 310/83 |
| 5,023,466 | 6/1991 | Isozumi | 310/88 |
| 5,508,566 | 4/1996 | Nagao et al. | 290/38 R |

FOREIGN PATENT DOCUMENTS 286081  3/1990  Japan ................... H02K 13/00

Primary Examiner—Thomas M. Dougherty
Assistant Examiner—B. Mullins
Attorney, Agent, or Firm—Cushman, Darby & Cushman IP Group of Pillsbury Madison & Sutro LLP

[57] ABSTRACT

In an armature of a starter motor, commutator bars are formed by bending one end portions of upper layer armature conductors toward the inner circumferential side in the radial direction along an axial end surface of an armature core. A brush which slidably contacts commutator bars is constructed in a multi-layered type comprised of two kinds of brush materials each having different specific resistance layered in a rotational direction of the armature.

14 Claims, 2 Drawing Sheets

STARTER WITH MULTI-LAYERED BRUSH STRUCTURE

CROSS REFERENCE TO RELATED APPLICATIONS

The present application is based on and claims priority from Japanese Patent Applications Hei 7-127904 filed on May 26, 1995 and Hei 8-87767 filed on Apr. 10, 1996, the contents of which are incorporated herein by reference.

BACKGROUND OF THE INVENTION

1. Field of the Invention

The present invention relates to a starter for starting an engine and in particular to a starter with a multi-layered brush structure.

2. Description of Related Art

Recently a further compactness is required for a starter for an automobile, since there is a little space left within an engine compartment in accordance with an increase of auxiliary parts necessitated for a higher performance of the engine. In order to meet this compactness requirement of the starter, a speed reduction type starter, in which a motor constituting a major part of the starter is made compact and capable of rotating at high rotational speeds by using a speed reduction device, is widely used.

However, when conventional speed reduction ratios of 4–5 are raised to 6–10 in order to realize the further compactness, a critical rotational speed and strength of a commutator both influenced by flexure of a rotary shaft of the motor (an armature shaft) become problems. However, in the conventional starter in which the commutator is disposed at one end side of an armature core in an axial direction of the rotary shaft of the motor, an axial length of the rotary shaft of the motor becomes long, thus, it is difficult to raise the critical rotational speed of the rotary shaft of the motor drastically. It is possible to raise the critical rotational speed by widening a diameter of the rotary shaft of the motor itself, but it would bring a contrary result to the compactness requirement.

A molded type commutator, which is formed by placing a plurality of commutator bars (e.g., copper bars) in a cylindrical shape or a disc shape and by fixing them with phenolic thermosetting resin, is used as the commutator. In this instance, the strength of the commutator is determined by the strength of the phenolic resin. Therefore, a drastic improvement of the strength of the commutator is a rather difficult problem to solve.

On the other hand, when a DC commutator motor is designed to rotate at high speed, the commutation property of the motor drops extremely due to a rise in reactance voltage. Thus, it becomes difficult to secure a durability of a brush because of spark generations. Providing auxiliary magnetic poles with fixed magnetic poles can be thought as one measure to improve the commutation property. However, since there is not enough room for providing those poles within the small commutator motor such as for the starter, the improvement of the commutation property is not expected by this measure. Therefore, it is necessary to improve the ability of the brush itself in order to improve the commutation property, and for this purpose, a multi-layered brush in which different brush materials, a low resistance layer and a high resistance layer, are laminated in the rotational direction of the commutator is well known (JP-A2-86081).

However, since a mechanical strength of this multi-layered brush is lower than that of a single-layered brush, vibration caused by an imbalance of the rotating portion becomes large at the time of the high speed rotation, and the strength of the brush is not enough to withstand this vibration.

SUMMARY OF THE INVENTION

In the light of the above-described problems, a primary object of the present invention is to provide a starter with higher durability and further compactness.

According to the present invention, a multi-layered brush in which a plurality of brush materials each having different specific resistance and commutator bars formed by bending end portions of armature conductors into the inner circumferential side in the radial direction along an end surface of the armature core are used. Therefore, since an axial length of an armature (a length of a rotary shaft) can be reduced, it becomes possible to set a higher critical rotational speed for the armature shaft to cope with a higher rotational speed. Furthermore, since there is no need of placing commutator bars or pieces of the commutator in a cylindrical shape or disc shape, nor fixing the commutator bars with molding resin, there will be no lack of strength of the commutator at the time of high speed rotation. As described above, since the axial length of the armature shaft can be reduced, vibration caused by the higher speed rotation is prevented. Therefore, the multi-layered brush which has lower mechanical strength compared with a single-layer brush can be used to cope with the higher rotational speed sufficiently. Thus, a decrease of the commutation property brought by a rise of reactance voltage in the event of the high rotational speed can be compensated by an application of the multi-layered brush.

Preferably, a speed reduction ratio is set to be 6 or more (conventionally less than 6). As a result, the armature can be made more compact owing to the higher speed rotation, and even when a magnet switch is disposed in the rear of the armature, a total length of a starter and an overall size of the starter can be reduced drastically.

BRIEF DESCRIPTION OF THE DRAWINGS

Additional objects and advantages of the present invention will become more readily apparent from the following detailed description of the preferred embodiments of the several embodiments hereof, when taken together with the appended claims and attached drawings, all of which form a part of this application. In the drawings:

DETAILED DESCRIPTION OF THE PREFERRED EMBODIMENTS (First Embodiment)

Figure 1:
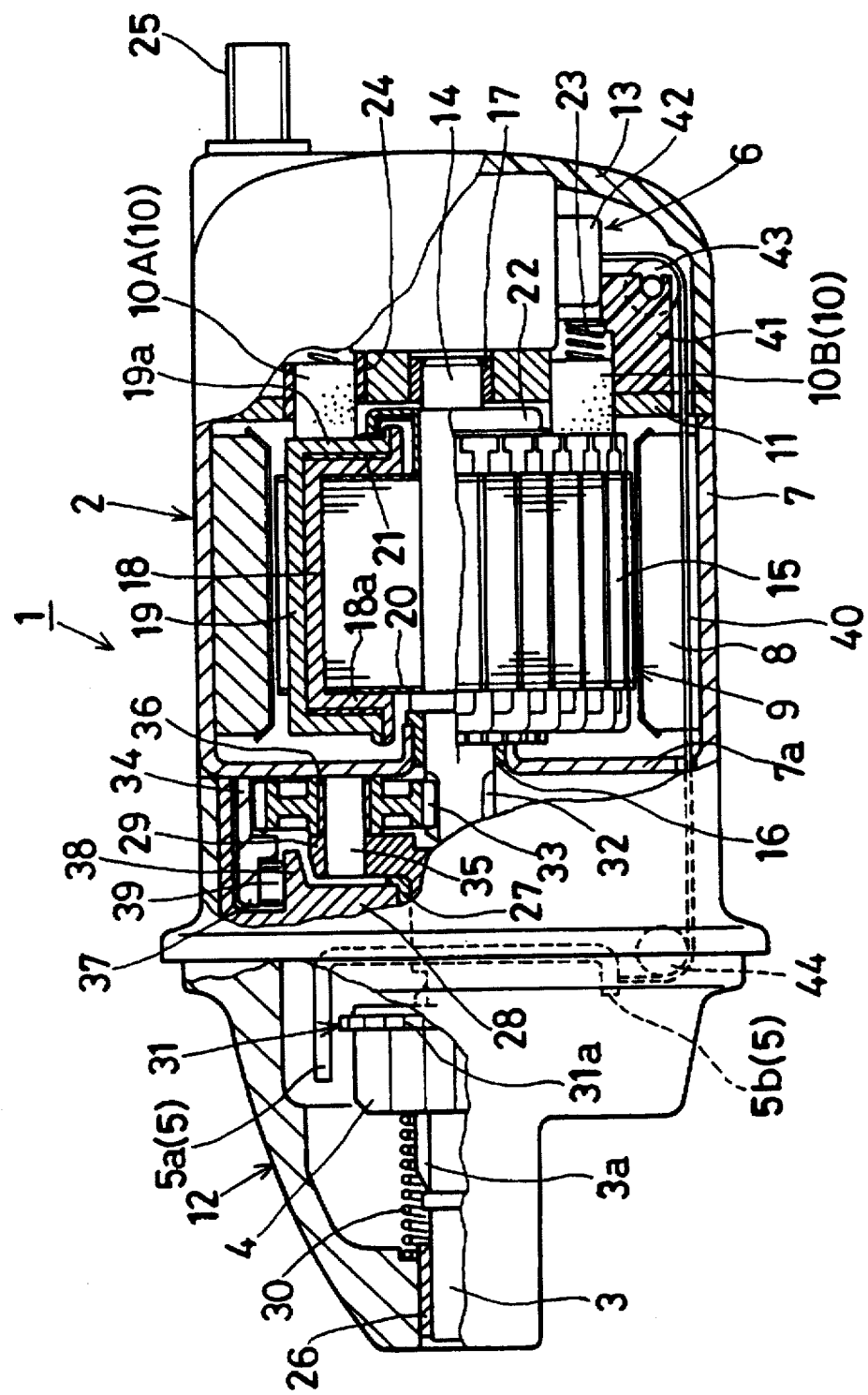
FIG. 1 is a partial cross-sectional view illustrating a starter according to a first embodiment of the present invention.

FIG. 1 shows a partial cross-sectional view illustrating a starter 1 according to the first embodiment.

Starter 1 is comprised of a starter motor 2 for generating a rotational power by receiving an electric power, an output shaft 3 for rotating by receiving the rotational power of starter motor 2, pinion 4 fitted on an outer circumference of output shaft 3, a rotational power transmitting mechanism for transmitting the rotational power of starter motor 2 to output shaft 3 (described below), a rotation regulating member 5 for regulating the rotation of pinion 4 at the time of starting an engine, a magnet switch 6 disposed in the rear (the right-hand side in FIG. 1) of starter motor 2 and so on.

(Starter Motor 2)

Starter motor 2 is comprised of a yoke 7, fixed poles 8, an armature 9, brushes 10 and so on.

Yoke 7 is press-formed (deep-drawn) to have a cylindrical shape with an open end (the right-hand side in FIG. 1) and held together with a brush holder 11 disposed in the rear of yoke 7 between a housing 12 and an end cover 13. A front end of yoke 7 is bent into an inner circumferential side in the radial direction and disposed as a partition wall 7a separating starter motor 2 from the rotational power transmitting mechanism.

Fixed poles 8 are comprised of a plurality of permanent magnets (e.g., 6 poles) to form a magnetic field and fixed to the inner circumferential surface of yoke 7. The permanent magnets of fixed poles 8 can be replaced with field coils which generate magnetic force by energization.

The armature 9 is comprised of a shaft 14 functioning as a rotary shaft, an armature core 15 disposed around the outer circumference of shaft 14, armature coils (described below) wound on armature core 15 and so on. Both end portions of shaft 14 are held rotatably by partition wall 7a and holder 11 via shaft bearings 16 and 17 respectively.

In armature core 15, a plurality of slots (not shown) for accommodating the armature coils are formed on the outer circumference along the axial direction.

Armature coils are comprised of a plurality of lower layer armature conductors 18 (e.g., copper-made) accommodated in the inner circumferential side of the slots and a plurality of upper layer armature conductors 19 (e.g., copper-made) accommodated in the outer circumferential side of the slots.

Both end portions 18a protruding from the slots are bent toward the inner circumferential side in the radial direction along the both axial end surfaces of armature core 15 respectively in lower layer armature conductors 18. Here, an insulation between both end portions 18a of lower layer armature conductors 18 and the end surfaces of armature core 15 is secured by way of a resinous ring 20 therebetween.

Both end portions 19a protruding from the slots are bent from the outer side of lower armature conductors 18 toward the inner circumferential side in the radial direction along the both axial end surfaces of armature core 15 respectively. Here, an insulation between end portions 18a of lower layer armature conductors 18 and the end portions of 19a of upper layer armature conductors 19 is secured by way of a resinous spacer 21 therebetween.

Lower layer armature conductors 18 and upper layer armature conductors 19 form the armature coils (an armature winding of the present invention) by electrically connecting, by means of welding or the like at a predetermined winding pitch, tips of both end portions of 18a and 19a bent toward the inner circumferential side in the radial direction respectively.

End portions 19a of upper layer armature conductors 19 which are bent along one of end surfaces of armature core 15 (the right-hand side in FIG. 1) are constructed to function as commutator bars respectively. End portions 19a of upper layer armature conductors 19, which are commutator bars, are fixed in the axial direction by a collar 22 press-fitted to shaft 14.

Figure 2:
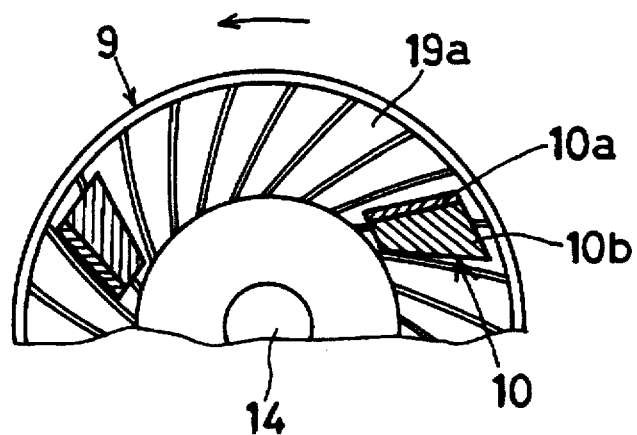
FIG. 2 is a cross-sectional view illustrating a commutator surface and brushes viewed from an axial direction according to the first embodiment.

Each brush 10 is comprised of at least a pair of brushes, a positive brush 10A and a negative brush 10B, held by holders 11 respectively, and is pressed to commutator bars 19a by respective springs 23 from the rear end side in the axial direction. Positive brush 10A is held via a resinous insulating cylinder 24 toward the metallic (e.g., made of aluminum) holder 11. Brush 10 is, as shown in FIG. 2, a multi-layered brush formed of two kinds of brush materials 10a and 10b each having different specific resistance and layered in the rotational direction indicated by an arrow of armature 9.

To be in more detail, brush 10 is comprised of a high resistance brush material 10a having a specific resistance of 600–2000 μΩ.cm and a low resistance brush material 10b having a specific resistance of 10–20 μΩ.cm. Low resistance brush material 10b is disposed forward relative to the rotation direction, and high resistance brush material 10a is disposed backward relative to the rotation direction of armature 9 respectively. Spring 23 for biasing brush 10 is held by end cover 13 which is to be fitted with the rear end side of holders 11. A terminal bolt 25 for connection with a battery cable (not shown) is fixed on end cover 13.

(Output Shaft 3)

Output shaft 3 is disposed coaxially with shaft 14 of armature 9, and the front end portion thereof is held rotatably by housing 12 via shaft bearing 26, and the rear end portion thereof is held rotatably by a center case 28 accommodated inside housing 12 via shaft bearing 27. The rear end portion of output shaft 3 is disposed protrudingly towards the outer circumference in the radial direction, and is formed integrally as a planet carrier 29 of a planetary gear reduction mechanism (described below). A helical spline 3a is formed on the outer circumference of output shaft 3 to which pinion 4 is fitted.

(Pinion 4)

A pinion helical spline (not shown) is formed on the inner circumferential surface of pinion 4 and is fitted with helical spline 3a formed on the outer circumference of output shaft 3. By advancing on output shaft 3 along helical spline 3a, pinion 4 comes to mesh with a ring gear (not shown) of an engine. Pinion 4 is biased constantly in the rearward direction of output shaft 3 by a spring 30 disposed in the front end side thereof. At the rear end of pinion 4, a rotation regulating plate 31 whose outer diameter is larger than that of pinion 4 is integrally formed. Around the outer circumferential surface of rotation regulating plate 31, numerous (a greater number than that of the outer teeth of pinion 4) engagement notches 31a are formed in the axial direction with a circumferential spacing between the adjacent two notches.

(Rotational Power Transmitting Mechanism)

Rotational power transmitting mechanism is comprised of the planetary gear reduction mechanism (a speed reduction means of the present invention) and a one-way clutch, and is accommodated by center case 28 in the forward direction from partition wall 7a of yoke 7.

The planetary gear reduction mechanism is a speed reduction device for reducing the rotational speed of armature 9 with a reduction ratio of 6 or more, and for increasing an output torque of starter motor 2. The mechanism is comprised of a sun gear 32 formed on the front end of the outer circumference of shaft 14, three planetary gears 33 for meshing with sun gear 32, an internal gear 34 for meshing with respective planetary gear 33, and the previously described planet carrier 29.

Sun gear 32 transmits the rotation of shaft 14 to three planetary gears 33 by rotating integrally with shaft 14.

Three planetary gears 33 are held rotatably by pins 35 which are fixed to planet carrier 29 respectively, via bearing 36. Meshing with sun gear 32 and with internal gear 34 as well as revolving around the outer circumference of sun gear 32, planetary gears 33 transmit their revolving power to planet carrier 29, and the rotational power is transmitted further to output shaft 3.

Internal gear 34 is formed in a cylindrical shape and its outer circumferential surface contacts slidably the inner circumferential surface of a cylindrical wall of center case 28, and is assembled into the same rotatably.

The one-way clutch supports internal gear 34 of planetary gear reduction mechanism rotatably in one way only (a direction to which internal gear 34 rotates by receiving the rotational power from the engine). The one-way clutch is comprised of a clutch outer 37, a clutch inner 38, rollers 39 and roller-biasing springs (not shown).

Clutch outer 37 is formed integrally with internal gear 34 at the front end thereof. In the inner circumference of clutch outer 37, a plurality of wedge-shaped cam chambers (not shown) are formed.

Clutch inner 38 is formed integrally with center case 28 formed in a cylindrical shape and extending in the axial direction keeping a predetermined space with clutch outer 37 in the inner circumferential side thereof.

Rollers 39 are accommodated in the cam chambers and regulate the rotation of clutch outer 37 by locking clutch outer 37 and clutch inner 38, when the rotational power of starter motor 2 is transmitted to output shaft 3.

The springs are accommodate in the cam chambers together with rollers 39 pressing corresponding rollers 39 to a narrower space of the wedge-shaped chambers.

(Rotation Regulating Member 5)

Rotation regulating member 5 is a spring member formed by winding a bar-shaped metallic material 3/2 turns and the both end portions thereof are bent by 90 degrees towards the same direction at radially opposing positions. One end portion 5a is a regulating bar which regulates the rotation of pinion 4 by engaging with engagement notches 31a formed on the outer circumferential surface of rotation regulating plate 31 at an early stage of the operation of starter 1. An end of a string-shaped member 40 such as a wire is engaged with the other end portion 5b and the operation of magnet switch 6 is transmitted thereto via string-shaped member 40.

Rotation regulating member 5 is held movably in the vertical direction (the downward direction in FIG. 1) in a state that its movement is restricted in the axial direction (the right-left direction in FIG. 1) towards center case 28. Rotation regulating member 5 is biased constantly upward by a return spring (not shown). When the operation of magnet switch 6 is transmitted to the other end portion 5b via string-shaped member 40 for starting starter operation, rotation regulating member 5 as a whole moves downward resisting the spring force of the return spring. When magnet switch 6 is turned off for stopping starter operation, on the other hand, rotation regulating member 5 returns to the original position (the position indicated in FIG. 1) by being biased upward by the spring force of the return spring.

(Magnet Switch 6)

Magnet switch 6 is disposed within end cover 13 and held by a pedestal 41 which is pressed and placed into holder 11. Magnet switch 6 is fixed so that its operational direction (the up-down direction in FIG. 1) crosses with shaft 14. When a starter switch (not shown) is turned on for starter operation and an built-in coil (not shown) is conducted by the battery, a plunger 42 accommodated in magnet switch 6 is attracted upward by magnetic force generated by the coil. As a result, a contact point (not shown) of a motor circuit arranged within magnet switch 6 is closed, electric conduction to armature 9 is started, and rotation regulating member 5 is pulled down via string-shaped member 40.

String-shaped member 40, as shown in FIG. 1, transmits the operation of plunger 42 by being guided by a roller 43 held by pedestal 41 as well as by a roller 44 held by center case 28.

(Operation)

The operation of the first embodiment will be explained next.

When magnet switch 6 starts its operation by turning on the starter switch, rotation regulating member 5 moves downward along center case 28, since string-shaped member 40 is pulled to the side of magnet switch 6 in accordance with the upward movement of plunger 42. As a result, the regulating bar 5a of rotation regulation member 5 meshes with engagement notches 31a of rotation regulating plate 31, so that the rotation of pinion 4 is regulated.

On the other hand, since the contact point of starter motor 2 is closed by the operation of magnet switch 6 and armature 9 is conducted, rotational power is generated by armature 9. Accordingly, three planetary gears 33 are driven and rotated by rotation of sun gear 32 together with shaft 14. At this point, internal gear 34 engaging with each planetary gear 33 tends to rotate to a certain direction by receiving rotational power of each planetary gear 33.

By this movement of internal gear 34, rollers 39 accommodated in the cam chambers of clutch outer 37 shift to a narrower space of the wedge-shaped cam chambers by being pressed by the respective springs, and engage the outer circumferential surface of clutch inner 38. As a result, the rotation of clutch outer 37 is regulated, since it is locked with clutch inner 38 (unrotatable) formed integrally with center case 28 via rollers 39. Therefore, since the rotation of internal gear 34 which is integrally formed with clutch outer 37 is regulated, three planetary gears 33 each rotating around pin 35 respectively revolve round the outer circumference of sun gear 32, its revolving power is transmitted to planet carrier 29 to drive and rotate output shaft 3.

Pinion 4 attempts to rotate as well by the rotation of output shaft 3 through helical spline fitting. However, since the rotation of pinion 4 is regulated by regulating bar 5a, the rotational power of output shaft 3 works as thrusting power pushing pinion 4 in the axial direction (leftward in FIG. 1). As a result, pinion 4 advances along helical spline 3a towards output shaft 3 and engages the ring gear of the engine.

When pinion 4 is engaged with the ring gear completely, the tip of regulating bar 5a comes off from engagement notches 31a of rotation regulating plate 31, and falls into the rear end side of rotation regulating plate 31. Therefore, the rotation regulation of pinion 4 is released. Due to this, the rotational power of output shaft 3 is transmitted to the ring gear in engagement with pinion 4, and thus the engine can be started by this rotation of the ring gear.

In a state that pinion 4 is moved forward and is engaged with the ring gear, biasing force of spring 30 which biases pinion 4 becomes large. After the engine is started and pinion 4 is rotated by the ring gear, the rotational power of the engine works to a direction which makes pinion 4 retreat by the operation of helical spline 3a. By these powers, pinion 4 attempts to retreat towards motor 2, however, since the regulating bar 5a fallen into the rear end side of rotation regulating plate 31 supports the rear end surface of rotation regulating plate 31, the retreat of pinion 4 is prevented.

When the starter switch is turned off for stopping starter operation and the operation of magnet switch 6 stops, pulling power pulling rotation regulating member 5 down via string-shaped member 40 dissipates, rotation regulating member 5 returns upward to the original position by the spring force of the return spring. As a result, regulating bar 5a having prevented the retreat of pinion 4 comes off from rotation regulating plate 31, pinion 4 receiving the biasing force of spring 30 and the retreating power from the ring gear, returns rightward to the original position (as shown in FIG. 1).

(Effects of First Embodiment)

Starter 1 according to the first embodiment is constructed by lower armature conductors 18 and upper armature conductors 19, both of whose end portions 18a and 19a are bent toward shaft 14 in the radial direction along the axial side end surfaces of armature core 15, and one of end surfaces (the end portion of the upper layer armature conductors) is formed as commutator bars 19a. Therefore, a total length of armature 9 can be reduced by far compared with a conventional starter in which a commutator is provided on shaft 14 at a position axially adjacent to the armature core. By taking this construction, a space between shaft bearing 16 and shaft bearing 17 supporting the both end portions of shaft 14 can be reduced, therefore, increasing a critical rotational speed of shaft 14 becomes possible without widening a diameter of the shaft particularly.

Since the end portion of upper layer armature conductors 19 is utilized as commutator bars 19a, the commutator in the present embodiment is not influenced by the strength of molding resin as is the case with the conventional commutator, therefore, allowable centrifugal force can be set higher. Due to this, reduction ratio, which used to be 4–5 in the conventional reduction type starter can be raised drastically to 6–10 in this embodiment. In addition to a space saving between shaft bearings 16 and 17 of shaft 14 even at the high reduction ratios as described, since a shaft outer-deviation between two shaft bearings is improved, the vibration of shaft 14 is repressed. As a result, multi-layered brush 10 having a superiority in commutation property, but having lower mechanical strength compared with a single-layered brush, can be utilized more stably. Therefore, starter motor 2 which is a major part of starter 1 can be manufactured more compact having a superiorly durable construction compared with the conventional starter motor.

Further, since the total length of armature 9 can be reduced, magnet switch 6 can be placed in the rear of starter motor 2 so that its operational direction is approximately perpendicular to shaft 14 of armature 9, therefore, an overall length of starter 2 can be reduced by far compared with the conventional starter. Especially, compared with the conventional starter which has magnet switch disposed in the outer circumferential side of starter motor, the starter according to the present embodiment whose radial directional dimensions are reduced drastically, has a much improved mountabiltiy to the engine.

(Second Embodiment)

Figure 3:
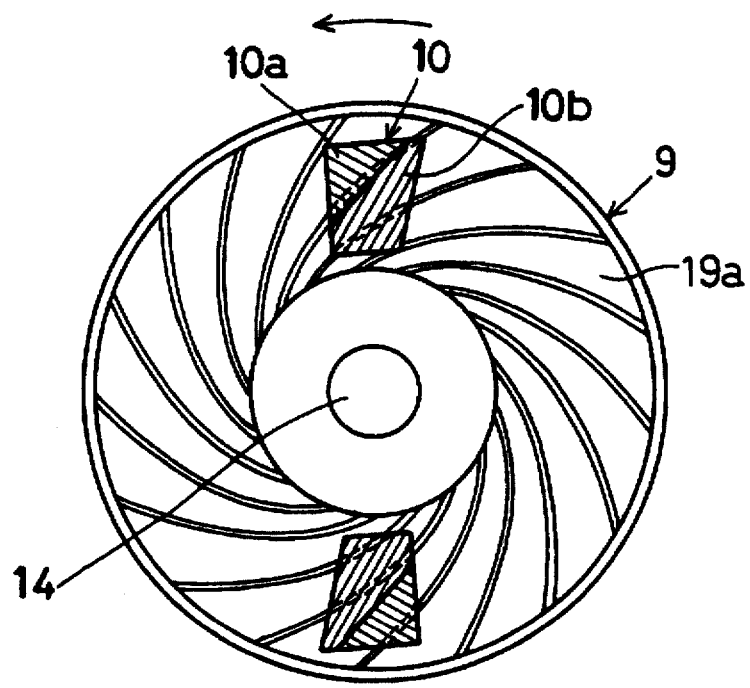
FIG. 3 is a cross-sectional view illustrating a commutator surface and brushes viewed from the axial direction according to a second embodiment.

FIG. 3 is a cross sectional view illustrating a commutator surface and brushes viewed from the axially rear direction.

In this embodiment, the number of poles of a starter motor 2 is set as two, and configurations of high resistance brush material 10a and low resistance brush material 10b both forming a multi-layered brush differ from those of the first embodiment. In other words, since configurations of commutator bars 19a vary in accordance with the number of poles of starter motor 2, the configurations of high resistance brush material 10a and low resistance brush material 10b become different, as shown in FIG. 3, from those in the first embodiment.

(Variation)

The double-layered brush comprising high resistance brush material 10a and low resistance brush material 10b is described in the first and second embodiments. However, the number of layers is not necessarily to be limited to two. It can have more than two layers each having different specific resistance.

An end portion of upper layer armature conductors 19 bent along one of axial end surfaces of armature core 15 is formed as commutator bars 19a in the first and second embodiments. However, by placing brush 10 on the other side of armature 9, an end portion of upper layer armature conductors 19 bent along the other axial end surface of armature core 15 can be also formed as commutator bars 19a.

Further, each armature conductor 18, 19 need not be formed integrally with respective ends 18a, 19a, but may be formed separately from respective ends and electrically connected.

Still further, as long as upper layer armature conductors 19 are bent radially inwardly toward shaft 14 at one axial end side thereof to provide respective commutator bars 19a, the other axial end side of each upper layer armature conductors 19 need not be bent radially inwardly along the axial side surface of armature core 15.

The present invention as described herein is not limited to the disclosed embodiments, but can be modified in a number of other ways without departing from the scope and spirit of the invention. All such changes and modifications are to be understood as being included within the scope of the present invention, as defined by the appended claims.

What is claimed is:

1. A starter comprising:

an armature having an armature core and a plurality of armature conductors accommodated on said armature core, both end portions of each of said armature conductors being connected at a predetermined winding pitch to form an armature winding; and a brush for conducting electricity to said armature winding, wherein first end portions of said armature conductors extend into an inner circumferential side in a radial direction along an axial end surface of said armature core as commutator bars to be contacted by said brush;

said brush being a multi-layered structure formed from a lamination of a plurality of brush materials having different specific resistances, said multi-layered structure being laminated in a circumferential directions; and each of said brush materials is in a single layer extending in the radial direction of said armature core.

2. A starter according to claim 1, wherein said brush materials include:

a high resistance brush material arranged at a leading edge of said brush in said rotational direction of said armature and having a specific resistance in a range of 600–2,000 μΩ.cm; and a low resistance brush material arranged at a trailing edge of said brush in said rotational direction of said armature and having a specific resistance in a range of 10–20 μΩ.cm.

3. A starter according to claim 1 further comprising:

a pinion for meshing with a ring gear of an engine; and a speed reduction mechanism for reducing a rotational speed of said armature and for transmitting reduced rotational speed to said pinion.

4. A starter according to claim 3, wherein said speed reduction mechanism has a speed reduction ratio set to 6 or more.

5. A starter comprising:

an armature core formed with slots and having axial end surfaces;

a rotary shaft for supporting said armature core;

a plurality of armature conductors accommodated in said slots of said armature core;

a plurality of end portions extending from axial ends of each of said armature conductors to an inner circumferential side in a radial direction along said axial end surfaces of said armature core and connected at a predetermined winding pitch respectively;

a yoke arranged in an outer circumferential side of said armature core and having a plurality of magnetic field poles;

a brush for flowing current to said armature conductors and arranged in sliding contact with said end portions, said brush being in a multi-layered structure formed from a lamination of a plurality of brush materials having different specific resistances, said multi-layered structure being laminated in a circumferential direction; and each of said brush materials is in a single layer extending in the radial direction of said armature core.

6. A starter according to claim 5, further comprising:

a pair of shaft bearings rotatably supporting said rotary shaft at both ends of said rotary shaft and positioned in a vicinity of said axial end surfaces of said armature core.

7. A starter according to claim 5 further comprising:

an output shaft;

a pinion fitted on said output shaft through a helical spline and engageable with a ring gear of an engine; and a speed reduction mechanism for reducing a rotational speed of said rotary shaft of said armature core and for transmitting reduced rotational speed to said output shaft.

8. A starter according to claim 5, wherein said brush includes:

a high resistance brush material arranged at a leading edge of said brush in said rotational direction of said armature and having a specific resistance in a range of 600–2,000 μΩ.cm.

a low resistance brush material arranged at a transverse edge in rotational direction of said armature and having a specific resistance in a range of 10–20 μΩ.cm.

9. A starter according to claim 8, wherein a radially extending side of said brush in said rotational direction is arranged substantially in parallel with an axially extending side of said end portions in said rotational direction.

10. A starter according to claim 8, wherein a radially extending side of said brush in said rotational direction is arranged to have a predetermined angle with an axially extending side of said end portions.

11. A starter according to claim 2, wherein:

said high resistance brush material has a generally uniform thickness; and said low resistance brush material has a varying thickness which increases from a radially inner side to a radially outer side of said armature core.

12. A starter according to claim 2, wherein:

said high resistance brush material is shaped in a triangular form and is positioned radially outside a radially innermost side of said low resistance brush material.

13. A starter according to claim 2, wherein:

said high resistance brush material and said low resistance brush material are attached to provide a lamination surface generally in line with a border between two adjacent commutator bars; and each of said commutator bars extends radially outwardly in a direction opposite to said rotational direction.

14. A starter according to claim 2, wherein:

said low resistance brush material has a cross-sectional shape which increases a surface area of contact with each of said commutator bars as each of said commutator bars moves thereacross; and said high resistance brush material has a cross-sectional shape which decreases a surface area of contact with each of said commutator bars as each of said commutator bars moves thereacross.

* * * * *